United States Patent [19]
Akiyama et al.

[11] 3,909,352
[45] Sept. 30, 1975

[54] PRODUCTION OF YEAST BIOMASS

[75] Inventors: Shunichi Akiyama; Munebaru Doi; Yoshiaki Arai; Yoshio Nakao; Hideo Fukuda, all of Osaka, Japan

[73] Assignee: Takeda Chemical Industries, Ltd., Osaka, Japan

[22] Filed: Feb. 22, 1974

[21] Appl. No.: 444,800

[30] Foreign Application Priority Data
Feb. 22, 1973  Japan............................... 48-21642

[52] U.S. Cl.................... 195/28 R; 195/49; 195/82
[51] Int. Cl.²........................................... C12B 1/00
[58] Field of Search............ 195/28 R, 28 N, 37, 46, 195/49, 82, 97, 98, 112, 114

[56] References Cited
UNITED STATES PATENTS

| | | | |
|---|---|---|---|
| 3,163,638 | 12/1964 | Miwa et al. ....................... | 195/28 N |
| 3,272,714 | 9/1966 | Watanabe ......................... | 195/28 N |
| 3,411,989 | 11/1968 | Nakao et al. ..................... | 195/28 N |

*Primary Examiner*—Lionel M. Shapiro
*Assistant Examiner*—R. B. Penland
*Attorney, Agent, or Firm*—Wenderoth, Lind & Ponack

[57] ABSTRACT

A yeast biomass which is rich in intracellular RNA is produced by cultivating a microorganism of the genus *Candida* which is sensitive to potassium chloride.

RNA has a wide application as condiments and pharmaceuticals.

3 Claims, No Drawings

PRODUCTION OF YEAST BIOMASS

This invention relates to a method for producing yeast biomass. More particularly, this invention relates to a method for producing yeast biomass rich in intracellular ribonucleic acid by cultivating a yeast of the genus Candida which is sensitive to potassium chloride and is able to assimilate at least one member selected from hydrocarbons, fatty acids, alcohols, oils and fats.

A remarkable demand has recently been observed in the industrial fields of nucleic acid utilization which, starting with ribonucleic acid (hereafter briefly RNA), produces 5'-nucleotides such as 5'-inosinic acid, 5'-adenylic acid, 5'-guanylic acid, 5'-cytidylic acid, 5'-uridylic acid, etc., which have been widely used as condiments, pharmaceuticals or their intermediates, and the corresponding nucleosides also have an increase demand as a material for RNA. This, in turn, has made it an important goal to manufacture RNA at low cost and in large quantities.

Heretofore, RNA has been harvested mainly from the biomass obtained by growing a yeast, particularly a yeast of the genus Candida in a culture medium containing molasses or pulping waste liquor as a principal source of carbon.

In this connection, several methods have been proposed for securing yeast biomass rich in RNA and, from technical points of view, these methods can be classified into the following three groups, namely:

Group 1: Methods for obtaining yeast biomass rich in RNA in which yeasts are grown under specified cultural conditions.

Group 2: Methods for obtaining yeast biomass rich in RNA in which yeasts are grown in a medium supplemented with some agents with specified activities or some precursors.

Group 3: Methods for obtaining yeast biomass rich in RNA, wherein the yeasts to which specified genetic features have been imparted are cultivated.

However, the methods classified in Group 1 not only require specific fermenters and ancillary equipment, but often encounter considerable difficulties in completing the fermentation. The methods of Group 2 require the use of some specified agents or precursors in which expensive materials or toxic substances such as heavy metals are mostly used which necessarily require troublesome procedures for avoiding possible pollution problems in the treatment of the fermentation waste liquor.

Furthermore, the methods of Group 2 are not desirable from the standpoint of public hygiene in that the RNA of yeast biomass containing such heavy metals or other toxic substances, either adhered or adsorbed thereto, is to be used as a starting material in the production of condiments, pharmacenticals or their intermediates.

Therefore, as possible means for producing yeast biomass rich in RNA, the art belonging to Group 3 is most desirable. However, the only known method of this type is the one involving the use of polyploids of Saccharomyces yeasts and yet even this method has not up to now provided sufficiently high yields.

Under the circumstances the present inventors conducted an intensive study to find yeasts which are able to utilize less expensive carbon sources and yet to give a biomass rich in RNA. The study led to the finding that yeasts belonging to the genus Candida, which are sensitive to potassium chloride, are extremely rich in RNA. The finding gave the impetus to the development of this invention.

Thus, the main object of the present invention is to provide a method for producing a yeast biomass which is rich in RNA.

Another object of this invention is to provide a process for producing RNA in a high yield.

Further object will be explained in the ensuing description.

The yeasts of the genus Candida which are to be employed in working this invention include, among others, *Candida albicans*, *Candida bovina*, *Candida brumptii*, *Candida catenulata*, *Candida claussenii*, *Candida curiosa*, *Candida curvata*, *Candida diddens*, *Candida diversa*, *Candida glaebosa*, *Candida guilliermondii*, *Candida humicola*, *Candida intermedia*, *Candida kefyr*, *Candida krusei*, *Candida lambica*, *Candida lipolytica*(This includes the yeasts classified as *Saccharomycopsis lipolytica* by Yarrow in 'Antonie von Leeuwenhock 38 357–360(1972)), *Candida lusitaniae*, *Candida macedoniensis*, *Candida melinii*, *Candida membranaefaciens*, *Candida mesenterica*, *Candida moggi*, *Candida norvegensis*, *Candida parakrusei*, *Candida parapsilosis*, *Candida pelliculosa*, *Candida pseudotropicalis*, *Candida punicea*, *Candida reukaufii*, *Candida rugosa*, *Candida sake*, *Candida salmonicola*, *Candida slooffii*, *Candida solani*, *Candida stellatoidea*, *Candida tenuis*, *Candida tropicalis*, *Candida utilis*, *Candida valida*, *Candida vini*, *Candida zeylanoides*, etc.

The yeasts which are referred to in this specification as "sensitive to potassium chloride" are those which comply with the following conditions: (An index to the determination of the yeasts sensitive to potassium chloride)

A loopful of cells are picked up from a slant culture of a given yeast of the genus Candida and inoculated into a test tube containing 3 ml. of medium A (described hereafter). The inoculated medium is incubated under shaking at 28°C for 24 hours and 0.025 ml. of the resultant culture is transferred to a test tube containing 3 ml. of Medium B (described hereafter), in which the yeast is shake-cultured at 28°C for 48 hours. The resultant culture is diluted to 1/50 concentration with water and a sample is put in a cell, 16 mm in inner diameter. The sample is measured for absorbance at 590 m$\mu$ by means of a spectrophotometer. When the absorbance value is not more than 0.050, the particular yeast tested is judged to be sensitive to potassium chloride. As a spectrophotometer for this purpose, Coleman Junior Spectrophotometer Model 6D, for instance, can be employed to advantage.

Medium A: 3 percent of glucose, 0.3 percent of meat extract, 0.3 percent of yeast extract, 0.5 percent of urea and 0.01 percent of $FeSO_4 \cdot 7H_2O$. It should be understood that when the yeast to be tested is not able to utilize glucose as carbon source or requires some special nutrient, one may employ Medium (A') which contains, in place of said glucose in Medium A, other carbon source or which is supplemented with some nutrients which the particular yeast requires for its growth.

Medium B (or Medium B') is equivalent of Medium A (or Medium A'), to which potassium chloride has been added in a molar concentration of 1.5.

Such Candida yeasts sensitive to potassium chloride can be easily selected by the so-called replica-plating method, in which each Candida yeast to be tested is grown on Plate Media Aa(A'a) and Ba(B'a), which are Medium A(or A') and Medium B(or B'), to which agar has been added, respectively, or by the procedure set out above as an index to the determination of yeasts sensitive to potassium chloride. In this connection, it is advisable to use a yeast of the genus Candida as a parent strain, to treat it with, for example, ultraviolet rays, X-rays or with chemicals such as N-methyl-N'-nitro-N-nitrosoguanidine, quinoline, nitrogen mustard, hydrogen peroxide or dimethylsulfoxide to induce mutation and to single out a suitable strain that satisfies the above index by employing, for example, the replica-plating method mentioned above.

Among these potassium chloride-sensitive strains, there are obtained yeasts whose biomass contain intracellular RNA as high as 12 percent. To measure the RNA content of the biomass of such a strain, the strain is cultivated under the following medium and cultural conditions, for instance, and the RNA contents of the resultant yeast biomass are measured.

In this case by using a less expensive material as a carbon source of the media, such as any of hydrocarbons, acetic acid and alcohols, for instance, strains which are able to assimilate such carbon sources can be simultaneously selected. A typical selection procedure is as follows. (Experiment)

1. The strain to be tested: *Candida lipolytica* TA-540, IFO 1657 (ATCC)

2. Method for isolating strains
(Group A) A cell suspension of the test organism (0.1 M phosphate buffer, pH 7.0) is diluted to a suitable concentration and the diluted suspension is smeared onto Plate Medium Aa (described above).
After 2 day cultivation at 28°C 200 strains are isolated at random from among the colonies developed.
(Group B) To a cell suspension of the test organism (The same buffer as above) is added a sufficient amount of N-methyl-N'-nitro-N-nitrosoguanidine to give a concentration of 300 µg/ml. and after a contact time of 30 minutes at 28°C, the cells are washed twice with sterile water and smeared onto Plate Medium Aa, which is incubated at 28°C for 2 days. From the resultant colonies there were picked up 199 strains at random. (Group C) The test organism is treated in entirely the same manner as that set forth above for Group B and, by means of the replica-plating method described hereinbefore for the selection of potassium chloride-sensitive organisms, 210 potassium chloride-sensitive mutants are isolated.

3. The method of growing the isolated strains
For all of the above groups, each of the isolated strains was cultivated in the following manner. A loopful of yeast cells, picked up from a slant culture are used to inoculate a 200 ml. creased conical flask containing 20 ml. of Medium S (see Example 1).

The yeasts are then grown at 28°C on a rotary shaker at 200 r.p.m. for 24 hours. A 0.5 ml. portion of the resultant culture is transferred to a 200 ml. creased conical flask containing 10 ml. of Medium M(see Example 1) supplemented with 1 percent (W/V) of n-paraffin mixture (purity 98 percent; n-paraffins of 12 to 18 carbon atoms) and 0.8 percent of urea and incubated at 28°C on a rotary shaker at 200 r.p.m. for 16 to 24 hours. To the culture broth thus obtained is added a single drop of a surface active agent (e.g. Emulgen 420 (Kao Atlas, K.K, Japan)

4. Method of analysis

1. Determination of the amount of yeast biomass
Five milliliters of the culture broth is centrifuged at 3000 r.p.m. for 15 minutes to harvest the biomass, which is then dried at 105°C for 24 hours. The dry weight of the biomass is taken as the amount of the biomass.

2. Measurement of RNA content
A 1 ml. portion of the culture broth is taken and its RNA content is measured by the method of Schmidt G. and Thannhauser, S. (Journal of Biological Chemistry 161, 83 (1945)). The amount thus found is expressed in terms of percentage per unit weight of biomass.

Emergence of yeasts which give a biomass rich in RNA

| RNA Content (%) | 0 – 2 | – 4 | – 6 | – 8 | – 10 | – 12 | – 14 | – 16 | – 18 | – 20 | Total |
|---|---|---|---|---|---|---|---|---|---|---|---|
| Group A | — | — | 2 | 195 | 3 | — | — | — | — | — | 200 strains |
| Group B | — | — | 83 | 114 | 2 | — | — | — | — | — | 199 strains |
| Group C | — | — | 88 | 102 | 7 | 2 | 7 | 4 | — | — | 210 strains |

The present inventors have been studying the reason for the high RNA contents of potassium chloride-sensitive yeasts but the phenomenon has not been completely accounted for as yet. However, it appears that potassium chloride bears a close relationship with the intracellular biosynthesis of RNA or metabolism controlling mechanisms of Candida yeasts. In the present specification and claims, yeast biomass which is referred to as rich in RNA is the one containing intracellular RNA not less than 12 percent, preferably 14 percent, and most desirably 15 percent.

The following method serves as a practical index evaluating the richness of biomass in RNA. Namely, to 0.5 ml. of a cultured broth, there is added 5.0 ml. of a mixture of ethanol-ether (1:1) and the whole system is stirred well, which is then subjected to centrifuge at 2,000 r.p.m. for 5 minutes to obtain precipitates. The resultant precipitates are washed with a 0.2N aqueous solution of perchloric acid and mixed with 1 ml. of a 1N aqueous solution of sodium hydroxide. After the mixture is maintained at 37°C for 20 hours, it is filled up to 10 ml. with a 10 percent aqueous solution of perchloric acid and filtered. The resultant filtrate is diluted ten times with a 0.2N aqueous solution of perchloric acid. The optical desity of the diluted solution at 260 mµ(c=1.0 cm) is measured and expressed as A.

On the other hand, 5 ml. of said cultured broth is subjected directly to centrifuge at 3,000 r.p.m. for 15 minutes to obtain precipitates, which is dried at 105°C for 24 hours, the dry weight (milligram(s)) of the precipitates is expressed as B.

Thus, in case where C in the following equation is not less than 0.12, this indicates that the tested biomass is rich in RNA.

$$C = \frac{34 A}{B}$$

In accordance with this invention, a yeast of the genus Candida having a sensitivity to potassium chloride and being able to give a biomass rich in RNA is cultivated under aerobic conditions. The carbon sources that can be employed include, among others, any one, or a mixture of two or more of various hydrocarbons such as decane, undecane, dodecane, tridecane, tetradecane, pentadecane, hexadecane, heptadecane, octadecane, nonadecane, eicosane, kerosene, gas oil, heavy gas oil, etc., fatty acids such as acetic acid, propionic acid, butyric acid, myristic acid, margaric acid, palmitic acid, oleic acid, etc., oils and fats such as soybean oil, sperm oil, cottonseed oil, etc., and monohydric and polyhydric alcohols such as methanol, ethanol, propanol, glycerol, etc. In particular, it is advantageous, from economic points of view, to employ the carbon sources which are available at low cost and in large quantities such as the primary and secondary products of petrochemical industries.

The nitrogen sources which can be employed to advantage in the cultivation according to this invention include organic nitrogeneous sources such as corn steep liquor, cottonseed cake, yeast extract, fish meal, corn meal, etc., inorganic ammonium salts and nitrates such as aqueous ammonia, ammonia gas, ammonium sulfate, ammonium chloride, ammonium carbonate, ammonium phosphate, sodium nitrate, ammonium nitrate, etc., and organic compounds such as urea and amino acids.

In addition to these sources of carbon and nitrogen, the medium is supplemented with various minerals adequate to the growth of the yeast to be employed, such as salts of iron, manganese, calcium, zinc, copper, aluminum, etc., phosphoric acid, etc., as well as vitamins and amino acids which may be required for their growth. The fermentation can be easily conducted continuously or batchwise.

The pH of the medium to be employed and of the culture broth in the course of cultivation is maintained simply within the optimum growth pH range of the yeast to be employed which is usually between about pH 2 and about pH 10 and preferably between about pH 3 and pH about 7.5.

To maintain the pH of the culture broth during the cultivation within such an optimum range, the medium may be supplemented, from time to time, with hydrochloric acid, sulfuric acid, phosphoric acid, aqueous ammonia, ammonia gas, an aqueous sodium hydroxide solution, an aqueous sodium carbonate solution, calcium carbonate, calcium hydroxide or the like or such organic acids as acetic acid.

Particularly, a solution containing suitable proportions of acetic acid on the one hand and aqueous ammonia, ammonia gas or aqueous sodium hydroxide solution on the other hand not only serves as both carbon and nitrogen sources but also functions to control the pH and, therefore, such a solution as above is particularly desirable for the cultivation of these yeasts from economic points of view as well.

As to the cultivation temperature, the temperature suited to the growth and intracellular accumulation of RNA of the particular strain is selected, usually from the range of about 10°C to 40°C.

Preferably, the cultivation is made at about 15°C to 28°C, and the cultivation period should be so selected that can provide a high RNA content economically, which may of course be widely variable with the medium employed as well as other cultural conditions.

The procedures for harvesting yeast biomass rich in RNA from the thus obtained culture broth containing the yeasts which are sensitive to potassium chloride and which is rich in RNA including for example a continuous or batchwise centrifugal separation method, filtration, sedimentation and other routine methods employable for the separation of microbial biomass.

The invention will be described in further detail by examples.

The IFO numbers assigned to the microorganisms used in the present specification indicate the accession numbers at the Institute for Fermentation, Osaka, Japan.

The ATCC numbers assigned to the microorganisms used in the present specification indicate the accession numbers at American Type Culture Collection, 12501 Parklawn Drive Rockville, Maryland 20852, U.S.A.

The quantitative determinations of RNA were performed by the method of Schmit, G and Tannhauser, S.; Journal (mentioned before).

In the following examples, the relationship between part(s) by weight and part(s) by volume corresponds to that between gram(s) and millilitre(s).

EXAMPLE 1

Candida lipolytica IFO 1657 (ATCC) was treated with N-methyl-N'-nitro-N-nitrosoguanidine in the conventional manner and the mutants were screened by the replica-plating method described above. Mutant L-42 (IFO 1648; ATCC 20400) thus selected was cultivated by the procedure set out in the index to the determination of potassium chloride sensitivity and the absorbance of the resultant culture was measured.

The absorbance found was 0.020. The absorbance for Candida lipolytica IFO 1657 (ATCC) which had been cultivated in the same manner was 0.188. Then, the yeast cells were taken from a slant culture of strain L-42 and inoculated into a fermenter containing 125 parts by volume of medium S (described hereafter). The cultivation was conducted at 28°C for 24 hours. 20 parts by volume of the resultant culture was transferred to a fermenter containing 1,000 parts by volume of a medium which was basal medium M (described hereafter) supplemented with the varying kinds of carbon sources indicated in Table 1, wherein the organisms were grown at the temperature of 28°C and the agitator speed of 1,500 r.p.m., with sparging at the rate of 1,500 parts by volume/min. Throughout this period, a 25 percent aqueous solution of ammonia was automatically fed so as to maintain the pH of the medium in the neighborhood of 4.5. Separately, cells of Candida lipolytica IFO 1657 (ATCC) were picked up from a slant culture thereof in a similar manner and cultivated by a procedure similar to that described above.

The amount of yeast biomass and the RNA content of the biomass in each of the above cultures were measured. The results are shown in Table 1.

To harvest RNA from the thus-obtained yeast biomass rich in RNA, conventional separatory procedures could be applied. A typical procedure was as follows. Thus, 100 parts by weight of these biomasses were suspended in 1000 parts by volume of a 10 percent solution of ammonium sulfate and the suspension was heated at 90°C for 4 hours to extract the RNA. After cooling, the system was centrifuged and the supernatant was brought to pH 2.0 by the addition of hydrochloric acid. The resultant crude RNA precipitates were collected by centrifuge, washed with 60 percent ethanol and dried under reduced pressure. The procedure yielded 10.4 parts by weight of crude RNA powder.

(ATCC) was also grown by precisely the same manner as above. The amount of biomass and RNA content of each of these culture broths were measured by procedures similar to those set forth in Example 1. The results are given in Table 2.

Table 2

| Cultivation time | Parent strain | | Strain L-42 | |
|---|---|---|---|---|
| | Dry weight of biomass | RNA content | Dry weight of biomass | RNA content |
| 18 hrs. | 10.0 g./l. | 11.4% | 5.6 g./l. | 17.6% |
| 20 " | 15.5 " | 9.9" | 8.9 " | 17.5" |
| 22 " | — | — | 12.7 " | 17.9" |
| 24 " | — | — | 14.9 " | 17.8" |

Table 1

| | *Candida lipolytica* | | | *Candida lipolytica* | | |
|---|---|---|---|---|---|---|
| | IFO 1657 (ATCC) (parent strain) | | | IFO 1648 (ATCC 20400) (mutant strain) | | |
| Carbon source (Concentration) | Cultivation time | Dry weight of biomass | RNA content | Cultivation time | Dry weight of biomass | RNA content |
| Glycerol (2%) | 16 hrs. | 10.0 g/l | 10.0% | 18 hrs. | 9.1 g/l | 17.4% |
| Ethanol (1%) | 16 " | 6.7 " | 9.6" | 16 " | 6.3 " | 17.0" |
| Acetic acid (1%) | 18 " | 4.6 " | 9.3" | 18 " | 4.4 " | 17.8" |
| Soybean oil (2%) | 20 " | 18.5 " | 8.0" | 22 " | 16.3 " | 15.0" |
| n-Paraffin (2%) (Commercial mixture, $C_{12}$-$C_{18}$) | 20 " | 21.0 " | 9.1" | 22 " | 18.1 " | 17.5" |
| Medium S: | 4.0% of glucose, 1.5% of $(NH_4)_2SO_4$, 0.9% of $KH_2PO_4$, 0.3% of $K_2HPO_4$, 0.3% of $MgSO_4.7H_2O$, 0.003% of $FeSO_4.7H_2O$, 0.3% of yeast extract, 0.3% of corn steep liquor, 0.5% of $CaCO_3$ and 0.01% of Actocol (antifoam by Takeda Chemical Industries, Ltd.) | | | | | |
| Medium M: | 0.3% of 80% phosphoric acid, 0.15% of KCl, 0.1% of $MgSO_4.7H_2O$, 0.003% of $FeSO_4.7H_2O$, 0.01% of $CaCl_2.2H_2O$, 0.1% of NaCl, 0.3% of yeast extract, 0.3% of corn steep liquor and 0.01% of Actocol. | | | | | |

EXAMPLE 2

A slant culture of L-42, IFO 1648 (ATCC 20400), a potassium chloride-sensitive mutant induced from *Candida lipolytica* IFO 1657, was used to inoculate the first seed fermenter containing 500 parts by volume of medium S (See Example 1) and cultivated under shaking at 28°C for 24 hours. The entire amount of the resultant culture was used to inoculate the second seed fermenter containing 25,000 parts by volume of medium S and cultivated at 28°C for 24 hours. 2,000 parts by volume of the culture thus obtained was transferred to a main fermenter containing 100,000 parts by volume of a medium, which was the basal medium M of Example 1 supplemented with 1.5 percent (weight-/volume) of n-hexadecane and cultivated at 22°C under aeration for about 24 hours. Throughout this period, 25 percent aqueous ammonia was automatically fed so as to maintain the pH of the medium in the neighborhood of 4.5. Separately, *Candida lipolytica* IFO-1657

The n-hexadecane in the medium was exhausted within 20 hours in the case of the parent strain and in 24 hours in the case of L-42.

EXAMPLE 3

A strain of *Candida tropicalis*, NH-20, IFO 1649 (ATCC 20401), which has been isolated from a soil sample obtained in the suburb of Nara, and strain IFO 1400, which is known as a standard strain (type culture) of this species, were each cultivated and the absorbance of each culture was measured by the above-described assay procedure for potassium chloride sensitivity. The results are 0.025 for the former and 0.166 for the latter. Then, the two strains were grown in the same manner as Example 1 (provided that the cultivation temperature in basal medium M supplemented with various carbon sources was 22°C). The amount of biomass and intracellular RNA content of each of these biomasses are shown in Table 3.

Table 3

| | *Candida tropicalis* | | | *Candida tropicalis* | | |
|---|---|---|---|---|---|---|
| | IFO 1649 (ATCC 20401) | | | IFO 1400 | | |
| Carbon source (Concentration) | Cultivation time | Dry weight of biomass | RNA content | Cultivation time | Dry weight of biomass | RNA content |
| Acetic acid (1%) | 18 hrs. | 4.4 g./l. | 16.2% | 18 hrs. | 4.2 g./l. | 9.8% |
| Glycerol (2%) | 18 hrs. | 9.0 g./l. | 16.9% | 18 hrs. | 8.4 g./l. | 9.6% |
| n-Paraffin (2%) (mixture, $C_{12}$-$C_{18}$) | 22 hrs. | 20.0 g./l. | 16.7% | 22 hrs. | 21.1 g./l. | 9.3% |

EXAMPLE 4

*Candida albicans* IFO 1650 (ATCC 20402), which had been isolated from a soil sample collected in the suburb of Osaka, and *Candida guilliermondii* IFO 1651 (ATCC 20403), as well as the standard strains (type cultures) of these species, i.e., *Candida albicans* IFO 1060 and *Candida guilliermondii* IFO 0566, were respectively cultivated and the absorbances of the resultant cultures were measured by the procedure described above in the definition of potassium chloride sensitivity. The results are set forth in Table 4.

Then, each of these strains was cultivated in the same manner as Example 3 and the amount of cells and cellular RNA content of the resultant culture were determined. The results are set forth in Table 4.

Table 4

| Test strain | Absorbance |
| --- | --- |
| *Candida albicans* IFO 1650 (ATCC 20402) | 0.045 |
| *Candida guilliermondii* IFO 1651 (ATCC 20403) | 0.030 |
| *Candida albicans* IFO 1060 | 0.125 |
| *Candida guilliermondii* IFO 0566 | 0.150 |

Table 5

| Carbon source (Concentration) | Test strain | Cultivation time | Dry weight of biomass | RNA content |
| --- | --- | --- | --- | --- |
| Acetic acid (1%) | *Candida albicans* IFO 1650 (ATCC 20402) | 20 hrs. | 4.0 g./l. | 15.3% |
| | *Candida albicans* IFO 1060 | 20 hrs. | 4.3 g./l. | 8.3% |
| | *Candida guilliermondii* IFO 1651 (ATCC 20403) | 18 hrs. | 4.4 g./l. | 15.5% |
| | *Candida guilliermondii* IFO 0566 | 18 hrs. | 3.9 g./l. | 7.7% |
| n-Paraffin (2%) (mixture, $C_{12}$–$C_{18}$) | *Candida albicans* IFO 1650 (ATCC 20402) | 26 hrs. | 16.9 g./l. | 15.8% |
| | *Candida albicans* IFO 1060 | 26 hrs. | 16.0 g./l. | 7.8% |
| | *Candida guilliermondii* IFO 1651 (ATCC 20403) | 22 hrs. | 18.3 g./l. | 15.4% |
| | *Candida guilliermondii* IFO 0566 | 22 hrs. | 18.9 g./l. | 8.5% |

EXAMPLE 5

*Candida intermedia* IFO 0761, *Candida krusei* IFO 0592, *Candida parapsilosis* IFO 0708, *Candida robusta* IFO 1000 and *Candida stellatoidea* IFO 1399 were each treated with N-methyl-N'-nitro-N-nitrosoguanidine and screened by the replica-plating method described hereinbefore. The mutant strains thus selected, *Candida intermedia* I-330 (IFO 1652) (ATCC 20404), *Candida krusei* K-109 (IFO 1653)(ATCC 20405), *Candida parapsilosis* P-74 (IFO 1654)(ATCC 20406), *Candida robusta* R-115 (IFO 1655) (ATCC 20407) and *Candida stellatoidea* S-541 (IFO 1656) (ATCC 20408), were each cultivated and the absorbances of the resultant cultures were measured by the procedure set out in the index of the determination of potassium chloride sensitivity.

The results are set forth in Table 6. As controls, their parent strains were also cultivated in the same manner and the absorbances of the resultant cultures were similarly measured. The results were as indicated below.

Table 6

| Test strain | Absorbance |
| --- | --- |
| *Candida intermedia* IFO 0761 | 0.115 |
| *Candida intermedia* I-330 IFO 1652 (ATCC 20404) | 0.040 |

Table 6 – Continued

| Test strain | Absorbance |
| --- | --- |
| *Candida krusei* IFO 0592 | 0.220 |
| *Candida krusei* K-109 IFO 1653 (ATCC 20405) | 0.030 |
| *Candida parapsilosis* IFO 0708 | 0.230 |
| *Candida parapsilosis* P-74 IFO 1654 (ATCC 20406) | 0.015 |
| *Candida robusta* IFO 1000 | 0.180 |
| *Candida robusta* R-115 IFO 1655 (ATCC 20407) | 0.040 |
| *Candida stellatoidea* IFO 1399 | 0.125 |
| *Candida stellatoidea* S-541 IFO 1656 (ATCC 20408) | 0.030 |

Then, these strains and, by way of controls, their parent strains were each cultivated by the procedure of Example 3 in which acetic acid and n-paraffin were used as carbon sources.

The amount of biomass and intracellular RNA content of the biomass were measured. The results are shown in Tables 7 and 8.

TABLE 7

| Test strain | Cultivation time | Dry weight of biomass | RNA content |
| --- | --- | --- | --- |
| *Candida intermedia* IFO 0761 | 20 hrs. | 3.9 g./l. | 7.8% |
| *Candida intermedia* I-330 IFO 1652 (ATCC 20404) | 20 hrs. | 4.0 g./l. | 15.0% |
| *Candida krusei* IFO 0592 | 18 hrs. | 4.5 g./l. | 6.7% |
| *Candida krusei* K-109 IFO 1653 (ATCC 20405) | 18 hrs. | 4.1 g./l. | 15.7% |
| *Candida parapsilosis* IFO 0708 | 20 hrs. | 4.2 g./l. | 7.2% |
| *Candida parapsilosis* P-74 IFO 1654 (ATCC 20406) | 20 hrs. | 4.2 g./l. | 15.2% |
| *Candida robusta* IFO 1000 | 20 hrs. | 3.7 g./l. | 8.1% |
| *Candida robusta* R-115 IFO 1655 (ATCC 20407) | 20 hrs. | 3.6 g./l. | 16.0% |
| *Candida stellatoidea* IFO 1399 | 20 hrs. | 4.5 g./l. | 7.2% |
| *Candida stellatoidea* S-541 IFO 1656 (ATCC 20408) | 20 hrs. | 4.4 g./l. | 15.5% |

Carbon source: acetic acid, 1.0%

Table 8

| Test strain | Cultivation time | Dry weight of biomass | RNA content |
| --- | --- | --- | --- |
| *Candida intermedia* IFO 0761 | 26 hrs. | 14.0 g./l. | 7.9% |
| *Candida intermedia* I-330 IFO 1652 (ATCC 20404) | 26 hrs. | 13.5 g./l. | 15.2% |

Table 8-Continued

| Test strain | Cultivation time | Dry weight of biomass | RNA content |
|---|---|---|---|
| Candida krusei IFO 0592 | 22 hrs. | 17.9 g./l. | 7.7% |
| Candida krusei K-109 IFO 1653 (ATCC 20405) | 22 hrs. | 16.5 g./l. | 15.0% |
| Candida parapsilosis IFO 0708 | 24 hrs. | 17.8 g./l. | 8.3% |
| Candida parapsilosis P-74 IFO 1654 (ATCC 20406) | 26 hrs. | 18.0 g./l. | 15.1% |
| Candida robusta IFO-1000 | 26 hrs. | 15.3 g./l. | 7.9% |
| Candida robusta R-115 IFO 1655 (ATCC 20407) | 26 hrs. | 15.4 g./l. | 15.9% |
| Candida stellatoidea IFO 1399 | 22 hrs. | 18.3 g./l. | 6.4% |
| Candida stellatoidea S-541 IFO 1656 (ATCC 20408) | 22 hrs. | 17.0 g./l. | 15.5% |

Carbon source: n-paraffin (mixture of $C_{12}$–$C_{14}$), 2%

What we claim is:

1. A method for producing yeast biomass which comprises; cultivating a yeast of the genus Candida, which is sensitive to potassium chloride and is able to assimilate at least one member selected from the group consisting of hydrocarbons, fatty acids, alcohols, oils and fats, in a medium containing at least one of said assimilable carbon sources as a principal carbon source; thereby producing in the cultivated medium the yeast biomass which contains not less than 12 percent by weight of intracellular ribonucleic acid; and recovering said biomass therefrom.

2. A process according to claim 1, wherein said yeast of the genus Candida is one belonging to any of the species *Candida lipolytica, Candida tropicalis, Candida guilliermondii, Candida albicans, Candida intermedia, Candida krusei, Candida parapsilosis, Candida robusta,* and *Candida stellatoidea*.

3. A process according to claim 1, wherein the resulting yeast biomass contains ribonucleic acid in amounts not less than 14 percent by weight.

* * * * *